United States Patent
Motoda

(10) Patent No.: US 11,807,502 B2
(45) Date of Patent: Nov. 7, 2023

(54) OPERATION UNIT OF LOAD HANDLING DEVICE

(71) Applicant: MOTODAGIKEN CO., LTD., Hachioji (JP)

(72) Inventor: Kimiyuki Motoda, Tokyo (JP)

(73) Assignee: MOTODAGIKEN CO., LTD., Tokyo (JP)

( * ) Notice: Subject to any disclaimer, the term of this patent is extended or adjusted under 35 U.S.C. 154(b) by 517 days.

(21) Appl. No.: 17/045,828

(22) PCT Filed: Feb. 3, 2020

(86) PCT No.: PCT/JP2020/003916
§ 371 (c)(1),
(2) Date: Oct. 7, 2020

(87) PCT Pub. No.: WO2021/156911
PCT Pub. Date: Aug. 12, 2021

(65) Prior Publication Data
US 2023/0166948 A1  Jun. 1, 2023

(51) Int. Cl.
*B66C 13/56* (2006.01)
*B66C 13/44* (2006.01)
(Continued)

(52) U.S. Cl.
CPC ............. *B66C 13/56* (2013.01); *B66C 13/44* (2013.01); *G05G 5/05* (2013.01); *B25J 13/02* (2013.01); *B66F 19/00* (2013.01); *G05G 1/08* (2013.01)

(58) Field of Classification Search
CPC . G05G 1/08; G05G 5/05; B66C 13/44; B66C 13/56; B25J 13/02; B66F 19/00
See application file for complete search history.

(56) References Cited

U.S. PATENT DOCUMENTS 3,850,307 A * 11/1974 Motoda ................. F16M 11/18
901/14
3,948,487 A    4/1976 Motoda
2011/0077590 A1   3/2011 Plicchi et al.

FOREIGN PATENT DOCUMENTS

JP    S49-20852 A    2/1974
JP    S53-157293 U   12/1978
(Continued)

OTHER PUBLICATIONS

International Preliminary Report on Patentability (Form PCT/IB/373) issued in counterpart International Application No. PCT/JJP2020/003916 dated Jul. 28, 2022, with Form PCT/ISA/237. (5 pages).

(Continued)

*Primary Examiner* — Adam D Rogers
(74) *Attorney, Agent, or Firm* — WHDA, LLP

(57) ABSTRACT

An operation unit includes a lever shaft having an operating lever at one end thereof and orthogonal to the operating lever, a plate with a flange having a bearing of the lever shaft, the other end-side of the lever shaft being arranged with penetrating the plate with a flange from a front surface thereof, a rotation restraint part for the lever shaft fixed to the lever shaft behind the plate with a flange and having a self-return function of forward and reverse rotations of the lever shaft, a cover with a flange covered on a backside of the plate with a flange in a form of sandwiching the rotation restraint part, a tip end-side of the lever shaft penetrating the cover with a flange via a bearing, and a potentiometer provided on a backside of the cover with a flange, rotation of the lever shaft being transmitted to the potentiometer.

4 Claims, 6 Drawing Sheets

(51) Int. Cl.
*B66F 19/00* (2006.01)
*G05G 5/05* (2006.01)
*B25J 13/02* (2006.01)
*G05G 1/08* (2006.01)

(56) References Cited

FOREIGN PATENT DOCUMENTS

| | | | |
|---|---|---|---|
| JP | S55-093484 U | | 6/1980 |
| JP | H3288793 A | | 12/1991 |
| JP | 07009372 A | * | 1/1995 |
| JP | 07061800 A | * | 3/1995 |
| JP | H08367 B2 | | 1/1996 |
| JP | H08225297 A | | 9/1996 |
| JP | 2578142 Y2 | | 8/1998 |
| JP | H11-208305 A | | 8/1999 |
| JP | 2005-112554 A | | 4/2005 |
| JP | 2007-245263 A | | 9/2007 |
| JP | 4200304 B2 | | 12/2008 |
| KR | 10-2001-0020044 A | | 3/2001 |
| WO | 99/05060 A1 | | 2/1999 |

OTHER PUBLICATIONS

International Search Report dated Mar. 17, 2020, issued in counterpart application No. PCT/JP2020/003916. (2 pages).
Office Action dated Dec. 4, 2022, issued in counterpart KR application No. 10-2020-7029812, with English translation. (2 pages).
Office Action dated Aug. 17, 2021, issued in counterpart TW Application No. 109109794, with machine translation. (9 pages).

* cited by examiner

OPERATION UNIT OF LOAD HANDLING DEVICE

BACKGROUND OF THE INVENTION

1. Field of the Invention

The present disclosure relates to an operation unit of a load handling device configured to cause an articulated arm mechanism for which a parallel link is mainly used to perform operations such as expansion/contraction, lifting and lowering, and rotation by a drive force of a motor and the like, and to move baggage (load) supported to a load part formed at a tip end portion of the am mechanism to any position that the load part reaches, wherein an operation part configured to cause the load part of the arm mechanism to perform at least the lifting and lowering operation is unitized.

2. Background Art

In the related art, a load handling device that mainly includes an articulated am mechanism for which a pantograph-shaped parallel link is used is widely used in diverse fields, as a simple crane-type labor-saving machine.

Many of the load handling devices are provided with an operation part for instructing operations of the arm mechanism (horizontal movement and lifting and lowering of a load part by expansion/contraction and the like of an arm), in the vicinity of the load part having a hook or the like provided to the arm on a tip end-side of the arm mechanism for supporting baggage. Also, many of the operation parts are provided with an operating lever that can foe gripped by an operator's palm.

The operation part is well known in PTLs 1 to 3, for example. The operation part has an operating lever having a substantial T-shape, as seen from above, and provided to be rotatable about a support shaft thereof (lever shaft) on an outer wall surface of a box body (box-shaped main body) having a substantial cuboid shape and forming an operation part main body, is configured such that when the operating lever is rotated in a clockwise direction, a command to lift the load part is generated, and when the operating lever is rotated in a counterclockwise direction, a command to lower the load part is generated, for example, and is provided in a form of a coupling component between a tip end of the arm on the tip end-side and the load part having the hook or the like.

In a case of a standard type load handling device (hereinbelow, also simply referred to as 'standard type') configured to handle baggage of which a size is not so large, for example, baggage of which a weight is about 100 kg to 200 kg, it is convenient to provide the operation part of the load handling device between the tip end of the arm on the tip end-side and the load part when lifting and lowering the baggage supported by the load part, moving the baggage in a plane with hanging the same, and the like.

However, in a case of a large load type load handling device (hereinbelow, also simply referred to as 'large load type') configured to handle baggage of which a weight is 500 kg or higher, the arm mechanism becomes also a high-strength/large-size/large-weight structure, and the baggage to be handled has also a large or different outer shape. In the case in which the baggage to be handled has a large or different outer shape, when supporting (gripping, hanging or the like) the baggage by the load part, if the operation part is adjacent to the load part, the operation part is disturbed by the baggage having a large or different outer shape supported with the load part, so that it is very difficult or impossible to operate the operating lever of the operation part.

Like this, in the case of the large load type load handling device in which the arm mechanism is large and the baggage to be handled has also a large or different outer shape, the standard type load part is replaced with a power load part configured to support or release the baggage by a drive force of a motor, a cylinder or the like, a control part configured to control operations of the power load part is located with being spaced as appropriate from the tip end of the am on the tip end-side of the arm mechanism, and the control part is coupled to the power load part via a coupling component such as an attachment.

The operation part of the standard type load handling device has such a form that all constitutional components of the operation part are arranged at the box-shaped main body arranged between the tip end of the arm on the tip end-side of the am mechanism and the load part. In the large load type load handling device, the power load part and the control part coupled to the power load part via the attachment are provided. Therefore, the box-shaped operation part that is used in the standard type cannot be converted to the operation part configured to lift and lower the power load part configured to support the baggage, as it is, so that an operation part separately manufactured is attached to the control part.

CITATION LIST

PTL 1: Japanese Patent No. 4,200,304
PTL 2: JP-B-8-367
PTL 3: Japanese Utility Model No. 2,578,142

SUMMARY

An object of the present disclosure is to provide an operation unit that can be incorporated into a box-shaped main body of a standard type load handling device and formed as a standard type operation part, and can be incorporated into a case of a control part to form an operation part, instead of a separate operation part attached to the control part of a power load part separately manufactured for a large load type load handling device.

In order to achieve the above object, an operation unit of the present disclosure includes: a lever shaft having an operating lever at one end thereof and orthogonal to the operating lever, a plate with a flange having a bearing of the lever shaft, the other end-side of the lever shaft being arranged with penetrating the plate with a flange from a front surface thereof, a rotation restraint part for the lever shaft fixed to the lever shaft behind the plate with a flange and having a self-return function of forward and reverse rotations of the lever shaft, a cover with a flange covered on a backside of the plate with a flange in a form of sandwiching the rotation restraint part, a tip end-side of the lever shaft penetrating the cover with a flange via a bearing, and a potentiometer provided on a backside of the cover with a flange, rotation of the lever shaft being transmitted to the potentiometer.

In the operation unit of the present disclosure, an overlapping flange part obtained by overlapping and integrating two flanges of the plate with a flange and the cover with a flange is formed with an attachment part that can be attached, as it is, to any of a box main body forming a standard type operation part and a front panel provided to a control part of a power load part by screwing.

In the operation unit, the rotation restraint part for the lever shaft includes a stopper plate fixed to the lever shaft, a spring pin erected on the stopper plate, a torsional coil spring attached to the lever shaft and formed to operate by the spring pin, and a stopper pin configured to restrain an operation of the torsional coil spring.

Also, the rotation of the lever shaft that is transmitted to the potentiometer is transmitted via a transmission mechanism including a drive gear provided to a tip end portion of the lever shaft and a driven gear provided to a knob shaft of the potentiometer with being in mesh with the drive gear.

According to the present disclosure, the overlapping flange part obtained by overlapping and integrating the two flanges of the plate with a flange and the cover with a flange, which are constitutional components of the operation unit, is formed with the attachment part at which the operation unit of the present disclosure can be mounted to either a sidewall having an opening of the box-shaped main body forming a standard type operation part or the front panel of a case forming the control part of the power load part configured to support and release baggage by a drive force by screwing. Therefore, when one operation unit is simply attached to the standard type box-shaped main body at the attachment part by screwing, it can be formed as an operation part. Also, when one operation unit is simply attached to the front panel of the case forming the control part of the power load part at the attachment part by screwing, it can be formed as a separate operation part.

DESCRIPTION OF EMBODIMENTS

Figure 1:
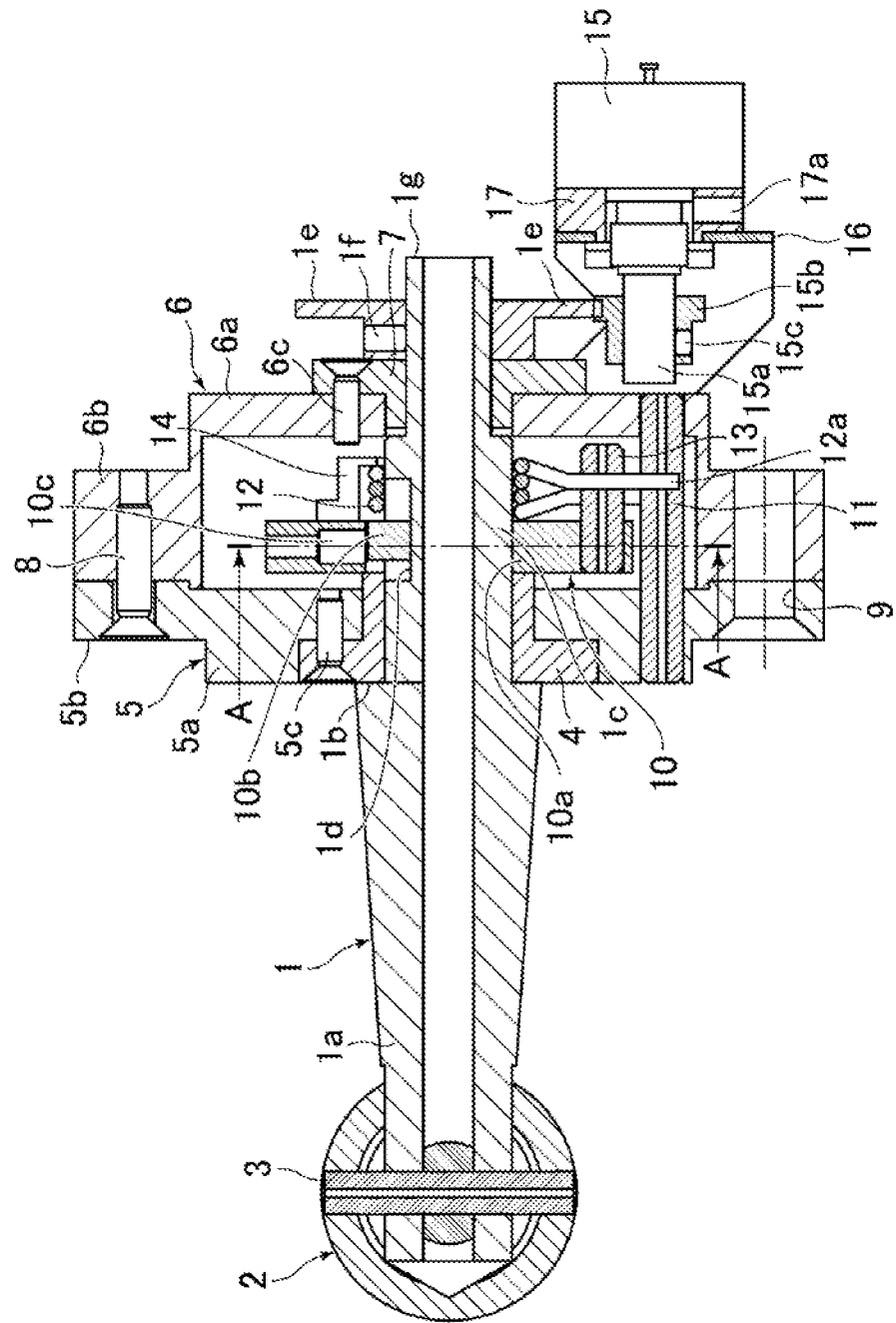
FIG. 1 is a longitudinally sectional side view of an example of an operation unit of the present disclosure.
Figure 2:
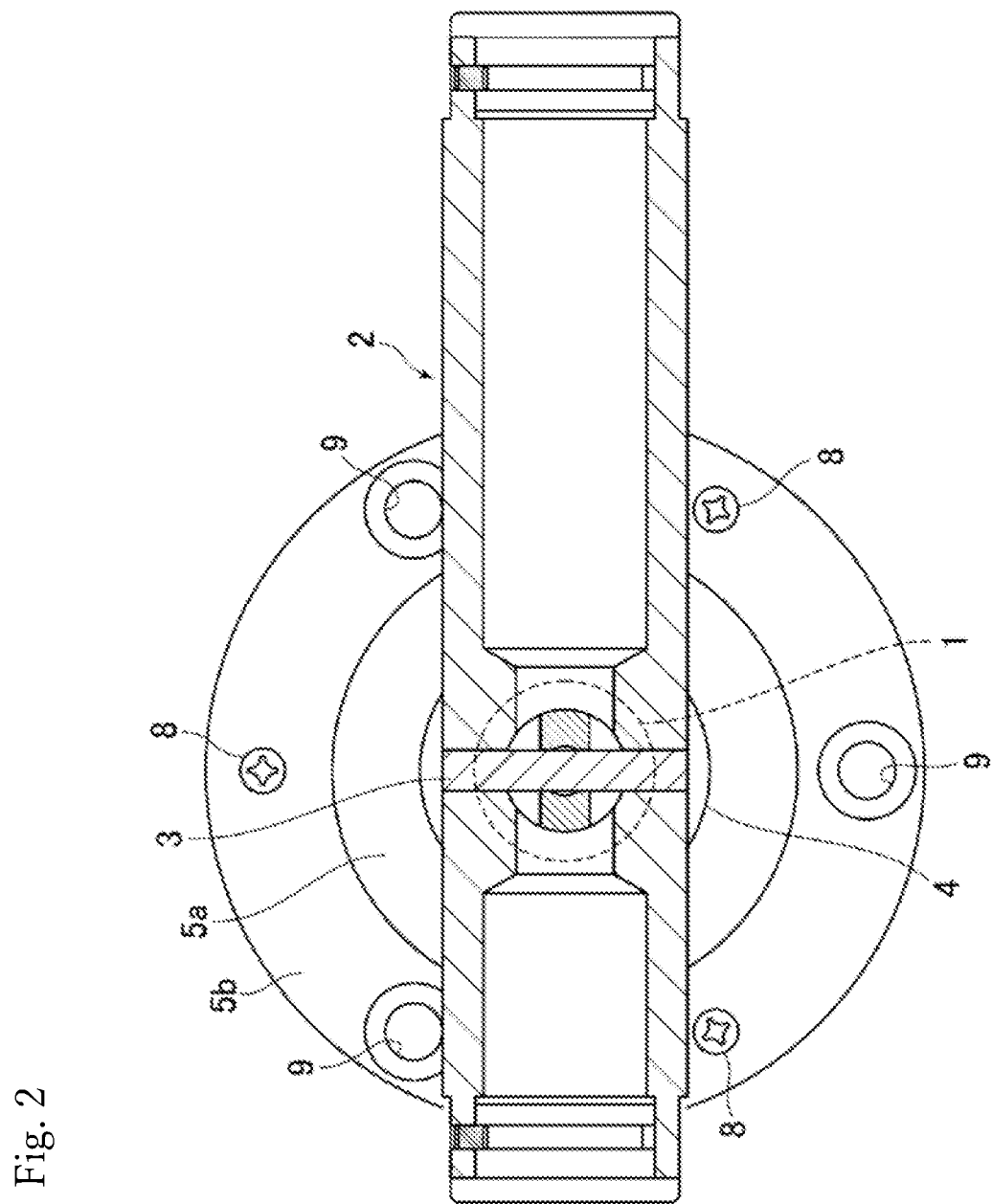
FIG. 2 is a left side view of the operation unit shown in FIG. 1.
Figure 3:
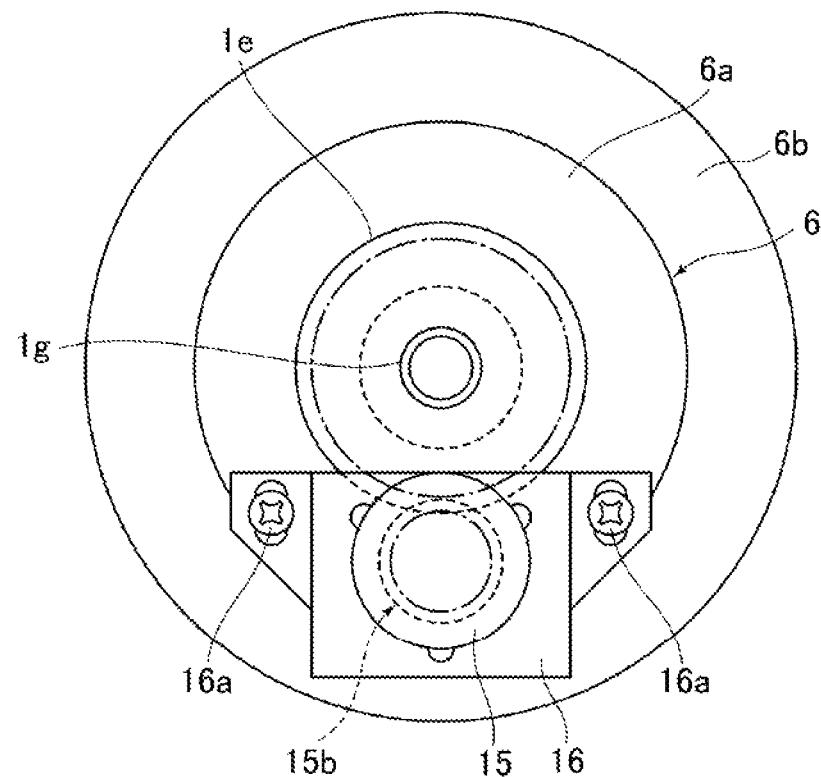
FIG. 3 is a right side view of the operation unit shown in FIG. 1.

Hereinbelow, an embodiment of the operation unit of the present disclosure will be described with reference to the drawings.

In FIGS. 1 to 7, a reference sign '1' indicates a lever shaft having a lateral operating lever 2 and orthogonal to the operating lever 2. The lever shaft 1 has a hollow pipe shape for weight saving, in which a side coupled to the operating lever 2 is formed as a tapered part 1a, and an opposite side to the tapered part 1a is formed as a stepped part 1c via a step portion 1b. A reference sign '3' indicates a coupling pin for the lever shaft 1 and the operating lever 2. The operating lever 2 is coupled in a position of about ⅓ of an entire length thereof to the lever shaft 1 via the coupling pin 3, and the lever shaft 1 and the operating lever 2 are coupled to form a substantial T-shape, as seen from above.

On a large-diameter portion of the stepped part 1c including the step portion 1b of the lever shaft 1, a plate 5 with a flange is mounted via a bearing 4. The plate 5 with a flange has a plate part 5a on a center-side on which the bearing 4 is located at a center, and a flange part 5b on an outer periphery-side of the plate part 5a. A reference sign '5c' indicates a coupling pin for fixing the bearing 4 to the plate part 5a.

A reference sign '6' indicates a cover with a flange covered on the plate 5 with a flange from a backside thereof on a backside of the plate 5 with a flange (an opposite side to the operating lever 2). The cover 6 with a flange has a cover main body part 6a at a center thereof having a bearing 7 for supporting a small-diameter portion Ig of the stepped part 1c of the lever shaft 1, and a flange part 6b arranged on an outer periphery-side of the cover main body part 6a.

The flange part 5b of the plate 5 with a flange (hereinbelow, also referred to as 'first flange part 5b') and the flange part. 6b of the cover 6 with a flange (hereinbelow, also referred to as 'second flange part 6b') have substantially the same outer diameters and widths, and are coupled at pitches of 120° on a circumference by three coupling screws 8. A reference sign '9' indicates attachment holes becoming an attachment part formed to penetrate the first flange 5b and the second flange 6b and provided at pitches of about 120° between the respective coupling screws 8 coupling the first flange 5b and the second flange 6b with being overlapped.

In a space formed by the plate part 5a and the cover main body part 6a facing each other of the plate 5 with a flange and the cover 6 with a flange of which the first flange part 5b and the second flange part 6b are coupled with being overlapped by the three coupling screws 8f the large-diameter portion of the stepped part 1c of the lever shaft 1 is located, and a rotation restraint part CL for the operating lever 2 (lever shaft 1) is mounted on the stepped part 1c. In the below, the rotation restraint part CL is described.

Figure 4:
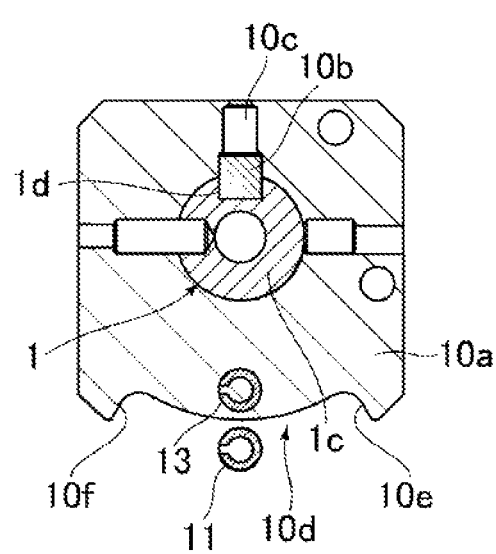
FIG. 4 is a front view of a stopper plate of a rotation restraint part.
Figure 5:
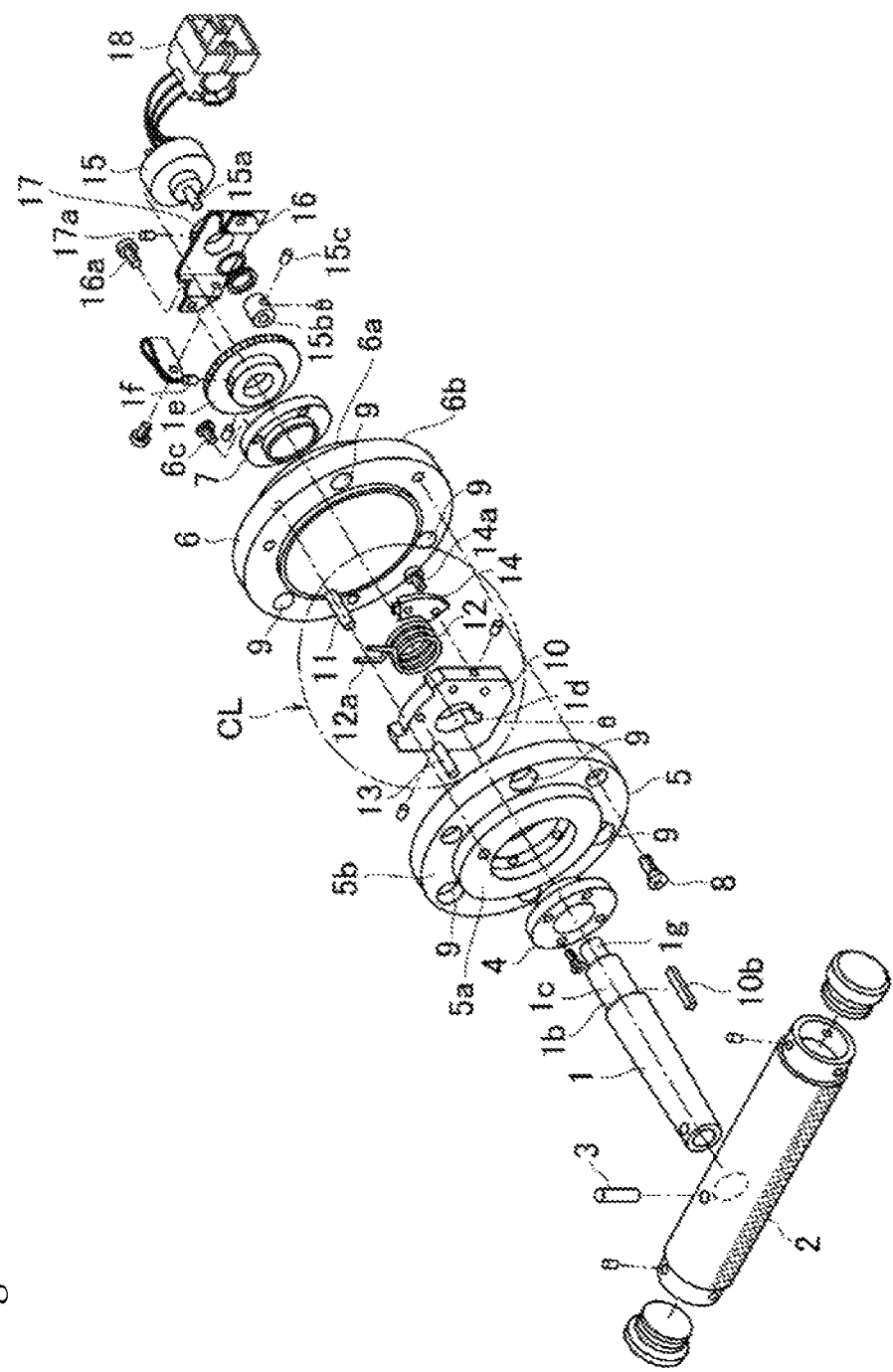
FIG. 5 is an exploded perspective view of the operation unit of the present disclosure.
Figure 6:
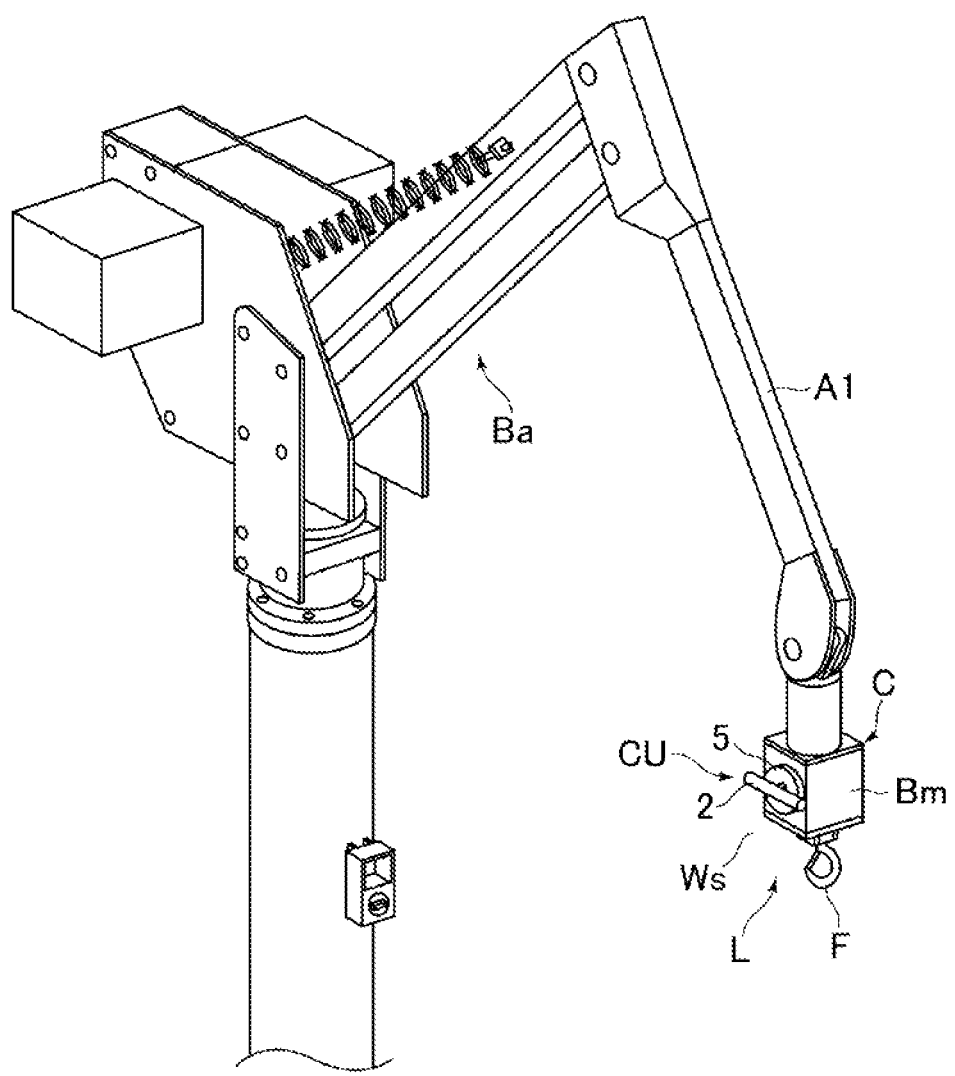
FIG. 6 is a perspective view of an example in which the operation unit of the present disclosure is applied to an operation part of a standard type lead handling device.

The rotation restraint part CL includes a stopper plate 10 attached to the large-diameter portion of the stepped part 1c of the lever shaft 1, a stopper pin 11 for stopping angular rotation of the stopper plate 10, a torsional coil spring 12 for transmitting, to the lever shaft 1, a force of returning the lever shaft 1 mounted to the lever shaft 1 and being rotated in a forward or reverse direction to its original position, a spring pin 13 for supporting a spring force of the torsional coil spring 12, and a spring pressing part 14 for pressing the torsional coil spring 12 toward the stopper plate 10 (refer to FIG. 4). In the meantime, the upper and lower of the rotation restraint part CL shown in the perspective view of FIG. 4 are reversed to the rotation restraint part CL shown in the sectional view of FIG. 1 with respect to the upper and lower direction.

The stopper plate 10 of the rotation restraint part CL is shown in the front sectional view of FIG. 4. A substrate 10a having a substantially rectangular shape, as seen from the front, is fixed to a key groove 1d of the stepped part 1c of the lever shaft 1 by a key 10b, so that the stopper plate 10 is integrated with the lever shaft 1. A reference sign 10c indicates a pressing screw of the key 10b. A lower side of the stopper plate 10 shown in FIG. 4 is formed in a guide groove 10d having a substantially concave arc shape of which a center is the lever shaft 1, and the stopper pin 11 is erected on the plate part 5a of the plate 5 with a flange in a position to enter the guide groove 10d. The stopper plate 10 configured to rotate integrally with the lever shaft 1 can rotate in the forward and reverse directions until both end portions 10e and 10f of the guide groove 10d collide with the stopper pin 11.

The torsional coil spring 12 protrudes outward from a torsional portion formed in a ring shape in which both ends of the spring are formed like legs. Herein below, the protruding portions are referred to as 'leg-shaped protrusions 12a'. The torsional coil spring 12 is externally fitted at the ring-shaped portion on the stepped part 1c of the lever shaft 1, and is positioned so that the spring pin 13 erected on an edge of an intermediate portion in the longitudinal direction of the guide groove 10d formed at the stopper plate 10 is interposed between two leg-shaped protrusions 12a.

The reference sign '14' indicates the spring pressing part for pressing the torsional coil spring 12 toward the stopper plate 10, and is formed such that a cover body having a substantially arc shape is fixed to the stopper plate 10 by a screw 14a.

The rotation restraint part CL for the lever shaft 1 (operating lever 2) configured as described above functions as follows. When the operating lever 2 is gripped with a hand and the lever shaft 1 is rotated in a clockwise direction in FIG. 2, the rotation is allowed until a right end (a reference sign 10e, in FIG. 4) of the guide groove 10d of the stopper plate 10 contacts the stopper pin 11, and the rotation in the clockwise direction beyond the range is not allowed.

During the rotation, the leg-shaped protrusions 12a of the torsional coil spring 12 mounted on the lever shaft 1 are pushed in the rotating direction of the lever shaft 1 by the spring pin 13, so that the torsional coil spring 12 is distorted and is thus applied with a returning force. The returning force applied to the coil spring 12 due to the distortion acts as a return force of returning the lever shaft 1 to its original position by elasticity of the coil spring 12 when the hand is released from the operating lever 2.

Also in the counterclockwise direction of the lever shaft 1, the rotation thereof is allowed until a left end (refer to FIG. 4) of the guide groove 10d contacts the stopper pin 11. In conjunction with the rotation, the spring pin 13 pushes the leg-shaped protrusions 12a of the torsional coil spring 12 in the distortion direction to automatically return the shaft 1.

A reference sign '15' indicates a rotary type potentiometer attached to the backside of the cover 6 with a flange via an attachment block 16 and an attachment spacer 17. The attachment block 16 has the attachment spacer 17, and the potentiometer 15 is attached to the attachment block 16 by an attachment screw 17a. A reference sign '16a' indicates an attachment screw for attaching the attachment block 16 to the backside of the cover 6 with a flange. Since the potentiometer 15 outputs an electric value (a resistance value or a voltage value) correctly corresponding to an angle of rotation, the potentiometer 15 has a transmission mechanism for transmitting the rotation of the lever shaft 1 for rotation.

The transmission mechanism is formed by a pinion gear 15b (driven gear) attached to a knob shaft 15a of the potentiometer 15 by an attachment screw 15c, and a drive gear 1e that is a large-diameter gear in mesh with the pinion gear 15b and is attached to a terminal portion of the lever shaft 1 (the small-diameter portion Ig of the stepped part 1c) by an attachment screw 1f. When the operating lever 2 is gripped with a hand and the lever shaft 1 is subjected to forward or reverse angular rotation within the allowable range for the rotation restraint part CL in the clockwise direction or the counterclockwise direction, the rotation is transmitted to the pinion gear 15b via the drive gear 1e by the transmission mechanism, so that the knob shaft 15a of the potentiometer 15 is rotated in the clockwise direction or the counterclockwise direction.

Here, the electric signals obtained by the angular rotation of the knob shaft 15a of the potentiometer 15 in the clockwise direction and the angular rotation in the counterclockwise direction are used for a control circuit of a servo motor (a lift drive source of the load handling device; not shown) to which the potentiometer 15 is connected, as signals for controlling the rotating directions of the servo motor (the lifting direction and lowering direction of the baggage being hung) and the number of rotations in each rotating direction (the lifting and lowering speeds of the baggage). A reference sign '18' indicates an electric coupler having lead lines connected to three terminals of the potentiometer 15.

An example of the operation unit CU of the present disclosure in which an operation part C is unitized is formed by the configuration from the lever shaft 1 having the operating lever 2 to the potentiometer 15 provided via the attachment block 16 and the attachment spacer 17. Subsequently, an application example of the operation unit CU of the present disclosure is described.

In the plate 5 with a flange and the cover 6 with a flange, described above the two flange parts 5b and 6b coupled and integrated by the coupling screws 8 are provided on the circumferences thereof with three attachment holes S penetrating the two integrated flange parts 5b and 6b. The attachment holes 9 may be three or more. The attachment holes 9 function as an attachment part when attaching the operation unit CU of the present disclosure to a sidewall Ws of a box-shaped main body Bm of the operation part C integrated with a load part L arranged at a lower end portion of an arm A1 on a tip end-side of a crane-type load handling device Ba including a pantograph-type arm mechanism (refer to FIG. 6). A reference sign 'F' indicates a hook for hanging baggage.

That is, the sidewall Ws of the box-shaped main body an is formed with a mounting hole (not shown) slightly larger than the cover main body 6a of the cover 6 with a flange and is also formed with sidewall screw holes (not shown) in positions corresponding to the attachment holes 9, the operation unit CU of the present disclosure is inserted into the mounting hole of the sidewall Ws from the potentiometer 15-side, and attaching screws (not shown) are fastened into the attachment holes 9 of the two integrated flange parts 5b and 6b and the sidewall screw holes, so that the operation unit CU of the present disclosure can be attached to the box-shaped main body Bm of the operation part C.

In the case in which the operation part C of the box-shaped main body Bm is provided with the operation unit CU of the present disclosure, integrally with the load part L arranged at the lower end portion of the arm A1 on the tip end-side, when hanging the baggage to the hook F of the load part L and lifting the same, the operator can perform operations of gripping the operating lever 2 with a dominant hand and lifting and lowering the baggage with attaching the other hand to the baggage, in a very natural posture.

In a case in which the baggage to be handled has a large or different shape, when the baggage is hung to the hook F, an outer shape of the baggage disturbs the operation of the operating lever 2, so that it is difficult to smoothly perform the operations of lifting and lowering the baggage.

For this reason, in the case of the load handling device Ba for large baggage, a power load part PL is formed by a large clamping device or chuck device in which an actuator such as an air cylinder is used as a drive source, instead of the operation part C and the hook F of the load part L. However, when the power load part PL is adopted, instead of the standard type operation part C and hook F, a control part Cp for operating and controlling the power load part PL is required, and a problem as to which place the operation part C for lifting and lowering the power load part PL is to be provided occurs.

Therefore, in the present disclosure, in order to solve the above problems, the operation unit CU in which the operating lever 2 and the potentiometer 15 are integrated via the plate 5 with a flange and the cover 6 with a flange is attached to a front panel Pf of a control box (case) Be in which a main body of the control part Cp spaced from or provided in the vicinity of the power load part PL is accommodated, thereby forming a separate operation, part Ca.

Figure 7:
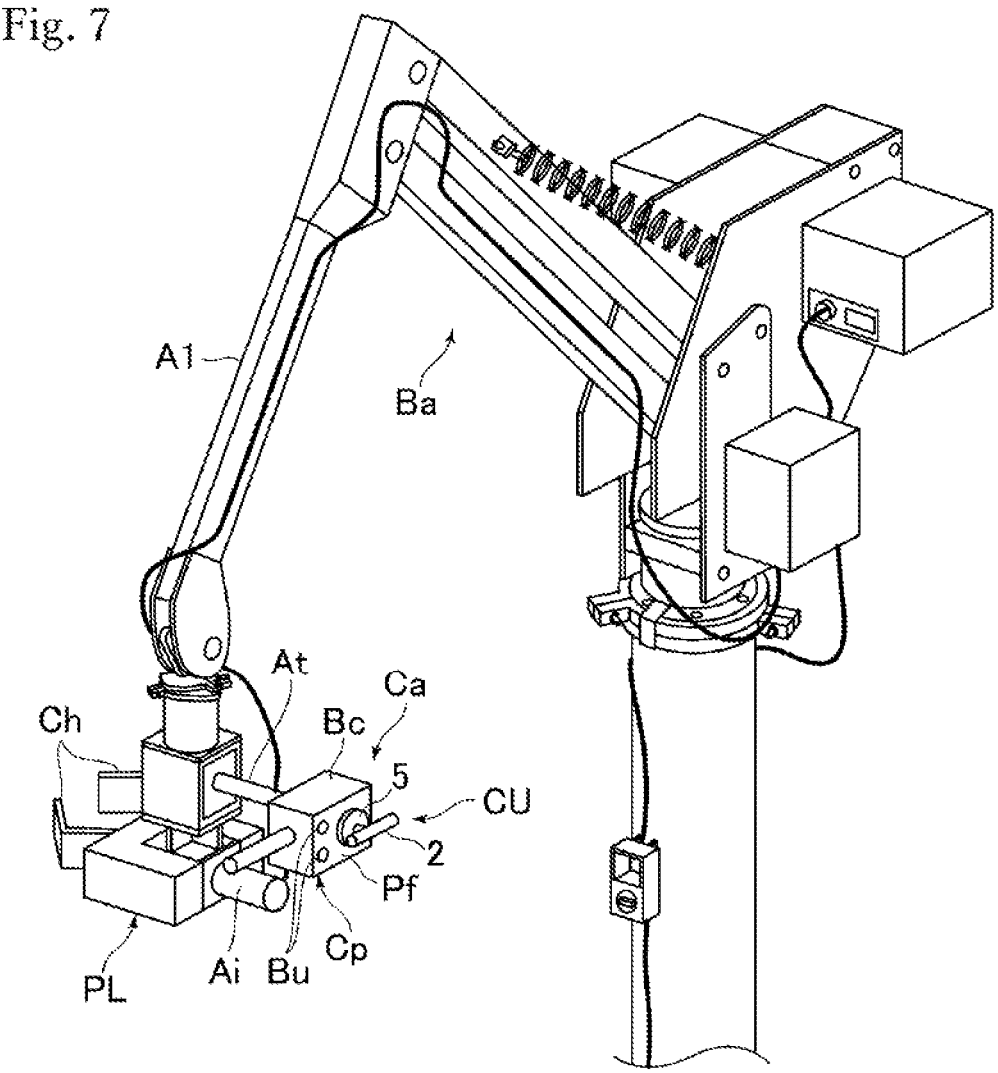
FIG. 7 is a perspective view of an example in which the operation unit of the present disclosure is applied to a separate operation part provided with being spaced from an arm on a tip end-side of an arm mechanism.

FIG. 7 depicts an example where a lower end portion of the arm A1 on the tip end-side is provided with an air cylinder-type chuck device as the power load part PL so as to support the large baggage and the control part Cp for controlling operations of the power load part PL is provided via a coupling attachment At coupled to the power load part PL. Herein, the operation unit CU of the present disclosure is inserted into the attachment hole formed in the front panel Pf of the case Be, in which the main body of the control part is accommodated, from a rear side (the potentiometer 15-side), and is attached to the case Be by fastening the attachment screws inserted in the attachment holes 9 to the front panel Pf, so that the separate operation part Ca is formed. In FIG. 7, a reference sign 'Ch' indicates a clamping chuck, a reference sign 'Ai' indicates an air cylinder that is a drive source of the clamping chuck Ch, and a reference sign 'Bu' indicates an operation button including a switch of the control part Cp.

The operator operates the operation button Bu such as a switch and a knob for operating the power load part PL arranged on the front panel Pf of the case Be of the control part Cp to clamp or put the large baggage in the power load part PL, and rotates the operating lever 2, which is formed on the same front panel Pf, of the operation unit CU of the present disclosure of the separate operation part Ca to lift and lower the large baggage clamped in the clamping chuck Ch of the power load part PL.

According to the present disclosure as described above, the operation unit of the present disclosure can be attached to either the sidewall of the box-shaped main body of the standard type operation part or the front panel of the control part of the power load part arranged on the case separately manufactured. Therefore, it is possible to apply one type operation unit to the standard type operation part. Also, the separate operation part for large load, which is separately manufactured and provided to each control part because each control part is also provided in diverse forms due to the diverse power load parts, can be formed by using one-type operation unit of the present disclosure.

What is claimed is:

1. An operation part of a load handling device comprising:
   an operating lever;
   a lever shaft orthogonal to the operating lever;
   a plate, the lever shaft penetrating the plate from a front surface thereof;
   a rotation restraint part having a self-return function of forward and reverse rotations of the lever shaft on a backside of the plate; and
   a potentiometer to which rotation of the lever shaft is transmitted,
   wherein the plate is formed into a plate with a flange, the backside of the plate is covered with a cover with a flange penetrated by a tip end-side of the lever shaft with the rotation restraint part interposed therebetween, the flanges of the plate and the cover are overlapped and integrated to form an integrated flange, the potentiometer is attached on a backside of the integrated flange and an attachment part having a screw hole is provided in the integrated flange to form an operation part unit.

2. The operation part of a load handling device according to claim 1, wherein the rotation restraint part arranged between the plate and the cover, which are integrated, in the operation part unit is formed to be provided with a stopper plate fixed to the lever shaft, a spring pin erected on the stopper plate, a torsional coil spring attached to the lever shaft and receiving torsional action by the spring pin, and a stopper pin restraining rotation of the stopper plate.

3. The operation part of a load handling device according to claim 2, wherein the rotation of the lever shaft that is transmitted to the potentiometer in the operation part unit is transmitted via a transmission mechanism including a drive gear provided to a tip end portion of the lever shaft and a driven gear provided to a knob shaft of the potentiometer with being in mesh with the drive gear.

4. The operation part of a load handling device according to claim 1, wherein the rotation of the lever shaft that is transmitted to the potentiometer in the operation part unit is transmitted via a transmission mechanism including a drive gear provided to a tip end portion of the lever shaft and a driven gear provided to a knob shaft of the potentiometer with being in mesh with the drive gear.

* * * * *